US012801430B2

(12) United States Patent
Shreve et al.

(10) Patent No.: US 12,801,430 B2
(45) Date of Patent: Nov. 17, 2026

(54) SYSTEM AND METHOD IMPLEMENTING A TASK SCHEDULER FOR A RESOURCE CONSTRAINED COMPUTATION SYSTEM

(71) Applicant: Genesee Valley Innovations, LLC, Santa Clara, CA (US)

(72) Inventors: Matthew A. Shreve, Campbell, CA (US); Eric D. Cocker, Redwood City, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 915 days.

(21) Appl. No.: 17/898,797

(22) Filed: Aug. 30, 2022

(65) Prior Publication Data

US 2024/0069962 A1 Feb. 29, 2024

(51) Int. Cl.
*G06F 9/48* (2006.01)
*G06F 9/38* (2018.01)

(52) U.S. Cl.
CPC .......... *G06F 9/4881* (2013.01); *G06F 9/3838* (2013.01)

(58) Field of Classification Search
CPC ............................. G06F 9/4881; G06F 9/3838
See application file for complete search history.

(56) References Cited

U.S. PATENT DOCUMENTS

2006/0288346 A1* 12/2006 Santos .................. G06F 9/4887 718/102
2013/0104140 A1* 4/2013 Meng .................... G06F 9/5066 718/104
2015/0268992 A1* 9/2015 Fan ....................... G06F 9/4881 718/106
2015/0356518 A1* 12/2015 De ........................ G06F 3/0481 705/7.21
2018/0314308 A1* 11/2018 Savidis ................. G06F 9/4893
2019/0340026 A1* 11/2019 Manda .................. G06F 9/4887
2020/0136994 A1* 4/2020 Doshi ................. H04L 41/0893

OTHER PUBLICATIONS

Topcuoglu, Haluk & Hariri, Salim & Wu, Min-You. Task scheduling algorithms for heterogeneous processors. 3-14. 10.1109/HCW. 1999. 765092. (Year: 1999).*
Medium (Greyboi), Serialising Functions in Python, Apr. 2, 2016 (Year: 2016).*
Arkhipenko, Github, Implementation Scenario and ideas, TaskScheduler Repository (Apr. 22) (Year: 2020).*

(Continued)

*Primary Examiner* — April Y Blair
(74) *Attorney, Agent, or Firm* — Krista A. Wittman

(57) ABSTRACT

A method and system for implementing a task scheduler are provided in a resource constrained computation system that uses meta data provided for each task (e.g. data analysis algorithm or sensor sampling protocol) to determine which tasks should be run in a particular wake cycle, the order in which the tasks are run, and how the tasks are distributed across the available compute resources. When a task successfully completes, it's time of execution is logged in order to provide a reference for when that task should be run again. Task meta data is formatted in a manner to allow for simple integration of new tasks into the processing architecture.

16 Claims, 4 Drawing Sheets

(56) References Cited

OTHER PUBLICATIONS

Mostafa Khatami, Amir Salehipour, T.C.E. Cheng, Coupled task scheduling with exact delays: Literature review and models, European Journal of Operational Research, vol. 282, Issue 1, 2020, pp. 19-39, ISSN 0377-2217, https://doi.org/10.1016/j.ejor.2019.08.045. (https://www.sciencedirect.com/science/ (Year: 2020).*
Arkipenko, Github, Concept of Task and Cooperative Task Scheduling, Sep. 18, 2020, TaskScheduler Repository (Year: 2020).*
Agronholm, Github, apscheduler userguide, ApScheduler Repository (Jul. 31) (Year: 2022).*

* cited by examiner

200

```
ood:{
            "func' : run_ood,
            'args' : (self.timesstamp_seconds_since_epoch,
${ood: confidence_threshold],
                     image_detections_folder,
images_hot_folder, ${ood:classes_of_interest}, 300),
            'sensor_dependency' : ['camera_0', 'camera_1' ],
            'task_dependency' : ['cam0', 'cam1' ],
            'power_estimate' : .001,
            'wakeup_link' : [ ],
            'priority' : 5,
            'max_frequency' : 5,
            'import' : 'from ood.ood_module import run_ood'
     ]
```

*FIG. 2*

SYSTEM AND METHOD IMPLEMENTING A TASK SCHEDULER FOR A RESOURCE CONSTRAINED COMPUTATION SYSTEM

STATEMENT REGARDING FEDERALLY SPONSORED RESEARCH OR DEVELOPMENT

This invention was made with United States Government support under Contract No. HR00112090101 awarded by DARPA. The United States Government has certain rights in the invention.

TECHNICAL FIELD

The present specification relates to task scheduling. In one example, it relates to task scheduling for a resource constrained computation system, e.g., a system comprising floating sensors (or sensor carrying devices or floats) deployed on the open sea. Thus, it finds suitable application in connection with, for example, oceanic sensors and will be described with particular reference thereto. However, it is to be appreciated that the subject matter described herein is equally suited to and/or adapted for other like applications.

BACKGROUND

It has been proposed to deploy inexpensive devices floating on the ocean to detect and report a variety of signals, including images, environmental information and signals generated by human activity and radio communications. For example, one proposed initiative aims to deploy a large fleet of inexpensive floating sensors (referred to herein as floats) that include cameras. One example of such a deployment is referred to as the Ocean of Things (OoT).

As proposed, the collected data including the image data collected by the float's camera is communicated from the float to a desired remote location (i.e., remote relative to the float) via a radio communication and/or wireless telecommunication link, e.g., a wireless link and/or radio communication to a satellite in orbit about the earth. The transmission of this data is generally permitted to employ and/or occupy a limited amount of time, bandwidth and/or other resources of the satellite and/or wireless link over which the transmission is being placed.

In some cases, these devices or floats may be restricted to selectively transmit acquired data with extremely limited data rates (e.g., 340 Bytes/20 minutes); in such cases, it is generally important to transmit only essential information that is relevant to a particular goal or objective. Also, available energy (e.g., limited by what an onboard solar panel can collect) is also a consideration as non-optimal execution of algorithms/tasks are a waste of energy. Under such restrictive constraints, it may be infeasible and/or undesirable to rely on traditional task scheduling.

BRIEF DESCRIPTION

In one aspect of the presently described embodiments, a method for scheduling tasks in a resource constrained system, the tasks being initialized by defined task dependencies, priority weights, execution parameter and power estimates, comprises determining tasks to be run based on time elapsed since last running of the task, building an acyclic graph based on the task dependencies, iteratively traversing the acyclic graph from a root node to leaf nodes to determine a set of tasks and an order of execution, merging sets of tasks based on common sub-tasks, selecting sets of tasks for execution, submitting the selected sets of tasks to core processors, and executing the submitted tasks.

In another aspect of the presently described embodiments, the determining of tasks to be run is based on availability of data and/or availability of a hardware resource, such as a sensor, to determine which tasks to run.

In another aspect of the presently described embodiments, the determining comprises comparing the time elapsed between when a task was last run and the desired time interval between task runs to determine which tasks to run.

In another aspect of the presently described embodiments, the task execution time is recorded in a log as a reference to determine the elapsed time from the last run of a particular task only when the task was successfully completed.

In another aspect of the presently described embodiments, the task meta data is formatted to provide information sufficient to execute the tasks within the system and comprises function label, function call parameters, and function call environment configuration such as import calls.

In another aspect of the presently described embodiments, the task run time or expected energy use is provided as task meta data and used against a per-cycle run time or energy use budget to determine which subset of tasks to run in a cycle.

In another aspect of the presently described embodiments, the summing priority weights of all sub-tasks wherein the selecting of sets of tasks for execution is based on a maximum summed priority weight and power estimates.

In another aspect of the presently described embodiments, a shared resource, such as an attached sensor, is provided as task meta data and used to construct the acyclic graph.

In another aspect of the presently described embodiments, at least one of the following parameters is user-configurable: task dependencies, priority weights, execution parameters, and power estimates.

In another aspect of the presently described embodiments, a task scheduler system for a resource constrained system, tasks being initialized by defined task dependencies, priority weights, execution parameters and power estimates, comprises at least one processor, at least one memory having code or instructions stored thereon, wherein execution of the code or instructions by the processor causes the system to determine tasks to be run based on time elapsed since last running of the task, build an acyclic graph based on the task dependencies, iteratively traverse the acyclic graph from a root node to leaf nodes to determine a set of tasks and an order of execution, merge sets of tasks based on common sub-tasks, select sets of tasks for execution submit the selected sets of tasks to core processors; and execute the submitted tasks.

In another aspect of the presently described embodiments, determining the tasks to be run is based on availability of data and/or availability of a hardware resource, such as a sensor, to determine which tasks to run.

In another aspect of the presently described embodiments, determining the tasks to be run comprises comparing the time elapsed between when a task was last run and the desired time interval between task runs to determine which tasks to run.

In another aspect of the presently described embodiments, the task execution time is recorded in a log as a reference to determine the elapsed time from the last run of a particular task only when the task was successfully completed.

In another aspect of the presently described embodiments, the task meta data is formatted to provide information sufficient to execute the tasks within the system and comprises function label, function call parameters, and function call environment configuration such as import calls.

In another aspect of the presently described embodiments, the task run time or expected energy use is provided as task meta data and used against a per-cycle run time or energy use budget to determine which subset of tasks to run in a cycle.

In another aspect of the presently described embodiments, the system is caused to sum priority weights of all sub-tasks wherein the selecting of sets of tasks for execution is based on a maximum summed priority weight and power estimates.

In another aspect of the presently described embodiments, a shared resource, such as an attached sensor, is provided as task meta data and used to construct the acyclic graph.

In another aspect of the presently described embodiments, at least one of the following parameters is user-configurable: task dependencies, priority weights, execution parameters, and power estimates.

BRIEF DESCRIPTION OF THE DRAWINGS

FIG. 2 illustrates an example algorithm definition of the task scheduler according to the presently described embodiments;

DETAILED DESCRIPTION

Figure 1:
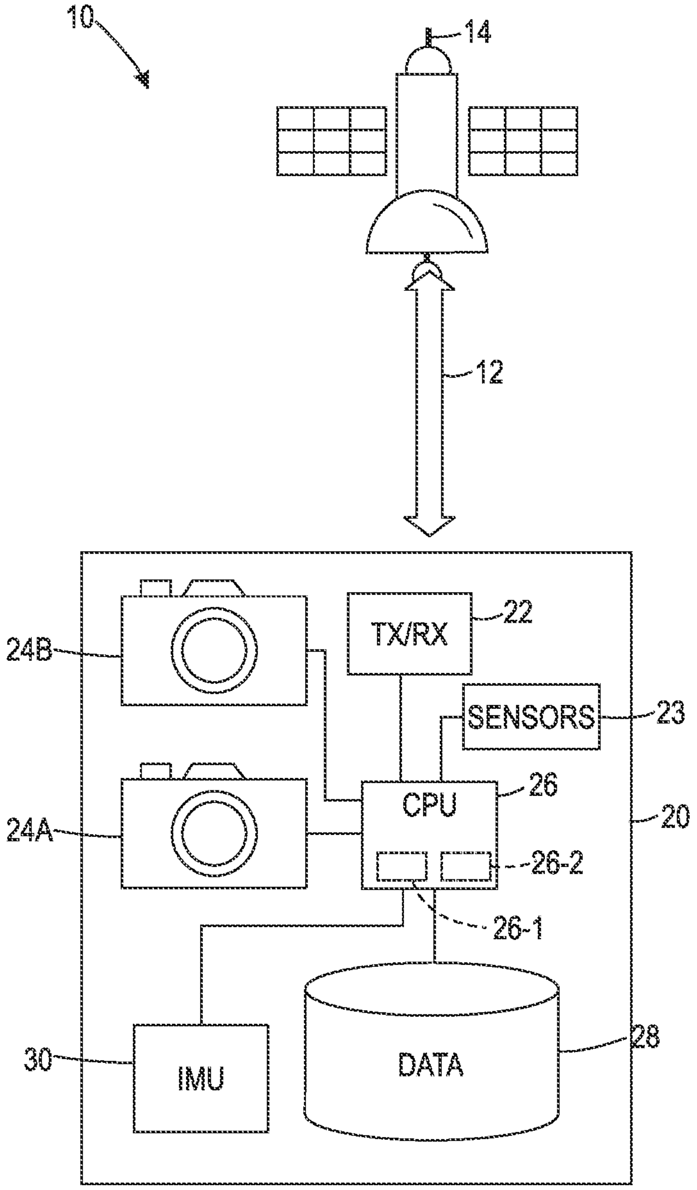
FIG. 1 illustrates an example system into which the presently described embodiments may be implemented.

Typically, a device will either run all sensor sampling and data analysis algorithms serially in a preset order or use an in-built operating system (OS) to manage distribution of tasks across available computing resources.

However, for the Ocean of Things (OoT) floats, uptime on a device's single board computer (SBC), which runs all of the data processing algorithms, is one of the dominant factors in managing overall system energy consumption. SBC uptime is largely driven by the run time of all tasks such as these data processing algorithms and the sampling protocols for any sensors attached to the SBC. The SBC has multiple cores available for processing so efficient distribution of tasks across available compute resources can improve uptime efficiency. The time coverage of data processed by each task varies by data types so each task does not need to be run every time the SBC is woken up. Also, efficiently scheduling tasks that use shared resources is a consideration, for example, for improving (e.g., optimizing) energy and resource usage. Additionally, there is a need to allow a user to configure which tasks, e.g., algorithms or sensor sampling protocols, a particular system runs and to easily enable integration of novel algorithms using over-the-air code updates.

According to the presently described embodiments, a task scheduler, in at least one form, uses meta data provided for each task (e.g., a data analysis algorithm or a sensor sampling protocol) to determine which tasks should be run in a particular wake cycle, the order in which the tasks are run, and how the tasks are distributed across the available compute resources. In at least one form, the tasks to be run are determined by the availability of data (e.g., if it is a data analysis algorithm) and/or the availability of an attached sensor (e.g., if it is a sensor sampling protocol) as well as by comparing the time elapsed from the last time the task was run with the desired time interval between task runs. In at least one form, task execution order is determined by constructing an acyclic task dependency graph based on the task dependency information provided in the meta data with each task (e.g., sampling of an attached sensor must be run prior to running analysis of the generated data). To determine task execution, the scheduler walks through the acyclic task dependency graph, finding all paths that start at the root node and end at each leaf node. Each path determines sets of tasks, called 'supertasks'. A supertask defines a collection of subtasks, their order of execution, total power estimate, and priority. A supertask's power estimate and priority are the summed values taken from each subtasks' corresponding value. Next, to remove any repeat executions for subtasks that are shared between supertasks, supertasks with overlapping subtasks are merged by taking the union of the set of their subtasks. If necessary, priorities are summed for each shared subtask when updating the supertask priority value. As an option, the combination of supertasks with the highest priority that can run given a current power budget are selected using, for example, a knapsack algorithm. In any event, whether or not priority is used as described or otherwise, the selected subtasks are then assigned, in the order defined by each supertask, to available compute resources as they become available. When a task successfully completes, it's time of execution is logged in order to provide a reference for when that task should be run again. Task meta data is formatted in a manner to allow for simple integration of new tasks into the processing architecture.

The presently described embodiments may be implemented in a variety of environments, particularly environments that are resource constrained, such as an Ocean of Things (OoT) float environment, as just one example. With reference to FIG. 1, there is illustrated such an example embodiment in a float environment of a system 10 including a sensor carrying device 20. In practice, the sensor carrying device 20 is equipped and/or otherwise provisioned with a transceiver 22. Via the transceiver 22, the sensor carrying device 20 wirelessly communicates (i.e., transmits and/or receives messages, signals and/or data) over a wireless telecommunications link 12. As shown, the link 12 operatively, wirelessly connects the sensor carrying device 20 to a satellite 14 in orbit about the Earth or other planet on which the sensor carrying device 20 is situated. In practice, the satellite 14 operates to relay messages, data and/or signals between the sensor carrying device 20 and an end user device, e.g., such as a computer, server or the like located remotely away from the sensor carrying device 20, which end user device receives data originating from the sensor carrying device 20 and/or administers operation thereof. A variety of sensors, at least some of which are mentioned herein but not specifically shown, may be implemented on the device 20 and are generally represented by element 23 in FIG. 1.

As shown, the sensor carrying device or float 20 is equipped and/or otherwise provisioned with at least one camera, but in this example case, two (2) cameras 24*a* and 24*b*, e.g., digital cameras, that selectively captures images of the environment in which the sensor carrying device 20 is placed. Although two (2) cameras are shown, any number of cameras (e.g. 1, 2, 3, 4, . . . ) could be used depending on the implementation. Also, it should be appreciated that a float equipped with one or more cameras is merely an example configuration. Other sensor configurations, including configurations without the camera or cameras, may be implemented. It should be appreciated that the camera(s) (if camera(s) are implemented) (only representatively shown for ease of illustration) will be suitably positioned on the float to achieve the objective of the implementation, e.g., to achieve suitable views in expected orientations to capture desired imaging. Suitably, the sensor carrying device or float 20 is made to be sufficiently buoyant to float on the surface of a body of water, e.g., such as an ocean, sea, lake, etc. In practice, the sensor carrying device or float 20 may be implemented as or on a buoy or the like and will be, on occasion, referred to herein as a float. It should be appreciated, however, that the presently described embodiments are most advantageously implemented in environments where small, lower-power multi-sensory floats are utilized. However, the presently described embodiments will nonetheless have advantages if implemented on traditional buoys with less power limitations.

Further, the sensor carrying device or float 20 includes an Inertial Measurement Unit (IMU) 30. The IMU 30 measures change in the pose or position of the sensor carrying device or float 20. The IMU 30 may also measure the velocity and other operational characteristics of the sensor carrying device or float 20. Such devices are well known and operate to measure and output forces, angular rates and orientation of an object. Typically, IMUs use accelerometers, gyroscopes and/or magnetometers to gather data. Here, a variety of configurations could be utilized, but in at least on form of the presently described embodiments, the IMU 30 operates in appropriate ways to utilize suitable sensors to measure and output data on, for example, pitch, roll and yaw, as well as other positional, orientational or operational data related to the sensor carrying device or float 20.

In a suitable embodiment, the sensor carrying device or float 20 is equipped and/or otherwise provisioned with a central processing unit (CPU) and/or data processor 26 and a data storage device 28. Of course, it should be appreciated that the processor 26 is provided with suitable non-transitory memory structures (not shown unless data storage 28 is used of such purposes) such as a memory or memories having stored therein code, instructions or routines that can be executed by the processor to perform functions or trigger or enable other components to perform functions. In practice, the data processor 26 controls operation of the sensor carrying device or float 20 and/or regulates operation of the various components thereof. Measurements and/or data collected, generated and/or produced by the sensors (e.g., cameras and IMU sensors) carried on the sensor carrying device or float 20, including IMU data on the pose and velocity of the sensor carrying device or float 20 generated, produced and/or output by the IMU 30 and image data generated, produced and/or output by, for example, the cameras 24*a* and 24*b* as a result of image(s) being captured thereby, are suitably stored by and/or maintained in the data storage device 28.

Additionally, the data processor 26 suitably performs image and/or other data processing on the data including image data (where applicable) as described herein. The results of such image and/or other data processing performed on the data may likewise be stored by and/or maintained in the data storage device 28. Suitably, the data storage device 28 may also store and/or maintain instructions, software, program code and/or the like which is executed by the data processor 26 to carry out the function(s) thereof and/or operation(s) performed thereby.

Further, the data processor 26 may be configured in a variety of different manners including as a system comprising multiple dedicated processor elements to perform specific functions or groups of functions. For example, in one form, more than one processor or processor element is provided. A first processor or processor element 26-1 tracks data constantly, or tracks data using dense reading techniques, for example, every two (2) to four (4) minutes. In at least one form, this processor element 26-1 operates in a low-power mode. In at least one form, it conducts less sophisticated processing (e.g., signal processing from the sensors) than the second processor. The types of tracked data from suitable on-board sensors may include, for example, atmospheric data, water data (e.g., salinity) or volatile organic compounds (voc) sensor data (related to, for example, plankton in the water). The first processor element, in one form, also controls and tracks the data generated by the IMU 30.

A second processor or processor element 26-2 may be provided that is triggered or engaged (or "wakes up") periodically, e.g., approximately every twenty (20) minutes and is also referred to herein as the single board computer, or SBC. In one form, this second processor element is a higher power or high compute processor or processor element than the first processor or processor element. In at least one form, it conducts more sophisticated processing (e.g., image processing, anomaly determination, data analysis, . . . etc.) than the first processor. When it wakes up, the second processor element performs suitable functions of data processing and management and may also trigger select sensors to perform, such as trigger the camera or cameras (if cameras are implemented) to capture and process images at an appropriate time, and then transfer processed and/or stored data, including the captured images, via satellite or cloud-based system. The second processor element also has access to the IMU 30 for purpose of, for example, determining the appropriate moment to capture an image. As will be appreciated, the presently described embodiments implementing a task scheduler achieve improved performance for the float in managing tasks to be completed during the awake time of the single board computer (SBC), or second processor element.

As alluded to above, it will be appreciated that the processor 26 and/or processor elements 26-1 and 26-2 (and any other processing devices implemented) will, in at least one form, use any of a variety of different memory devices (not shown except that such devices may be represented by or incorporated in memory device 28 in some examples). Such devices, for example, will take the form of non-transitory computer or machine-readable mediums having code or instruction, stored thereon, for execution by the appropriate processors to enable or cause the system to perform or function as described.

In practice, stored and/or processed data is wirelessly transmitted via the transceiver 22 from the sensor carrying device 20 over the link 12, e.g., to the satellite 14 which in turn relays the processed image data to the end user device. Suitably, the transmitted data is relayed to the end user device from the satellite 14 over a suitable telecommunications network with which the satellite 14 is in operative communication.

In practice, due to the limited resources of the satellite 14, traffic constraints on the link 12 and/or otherwise, a significantly limited bandwidth and/or data rate is established and/or imposed for the transmission of data, including image data, from the sensor carrying device 20 over the link 12. For example, the aforementioned bandwidth and/or data rate may be limited to around no more than 340 bytes per 20 minutes. Accordingly, the image and/or other data processing performed by the sensor carrying device 20 (e.g., via the data processor 26) generates and/or produces processed data such as image data which is suitably compressed to fit within a designated size, e.g., within a set limit and/or determined number of bytes or bits. In this way, the processed data can be efficiently transmitted from the sensor carrying device 20 (e.g., via the transceiver 22) over the link 12 within the allotted bandwidth and/or at the imposed data rate while maintaining a suitable amount of desired information from the corresponding data such as image data captured by the camera 24.

With reference now to FIG. 2, definitions of the parameters of the task scheduler are shown in a screen shot 200. As will be appreciated, the parameters help define the system to implement the task scheduler—which again, will improve performance of the float in managing tasks to be completed during the awake time of the single board computer (SBC), or second processor element. In this regard, in a resource constrained system such as the Ocean of Things (OoT) float system, the presently described embodiments, through an appropriately implemented and defined task scheduler, can lessen or minimize the time that the single board computer (SBC) is actually up-and-running (thus, saving power resources) and allows for flexibility inasmuch as the system can be modified with relative ease. Of course, these are merely examples, but in one form, the definitions include:

'func': This is the name of function.

'args': This refers to arguments passed to function.

'sensor dependency': This identifies sensors that must be defined for the algorithm to be run and allows the system to be run on different float configurations without a priori definition of sensor configuration.

'task dependency': This identifies other algorithms that need to be run before this one. This information also allows tasks to be run concurrently if there is no dependency—to increase or maximize efficiency of running tasks.

'power estimate': This provides an energy use estimate for algorithm to be used for energy-based algorithm scheduling.

'wakeup link': This identifies wakeup cases that trigger this algorithm to be run.

'priority': This identifies any additional optimization parameter such as, for example, the mentioned "knapsack" routine.

'max_frequency': This identifies minimum time interval between task executions.

'import': This identifies modular code imported to minimize code execution overhead.

With appropriately defined parameters, the presently described embodiments may be implemented, for example, using the single board computer (SBC), or the second processor 26-2 of the float device 20, in conjunction with suitable memories (e.g., storage memory 28, or other devices) and executable code or instructions stored in such memory locations. Of course, the task scheduler, as well as other functions of the float device 20, are triggered by or performed upon execution of suitable stored code or instructions by, for example, the single board computer (SBC) or second processor 26-2 of the float system. Accordingly, the presently described embodiments provide a system for managing when a set of tasks, such as taking a sample from a sensor or running a data processing algorithm, are run on a device, e.g., such as a float device 20, in a manner that minimizes device uptime to improve energy efficiency.

Figure 3:
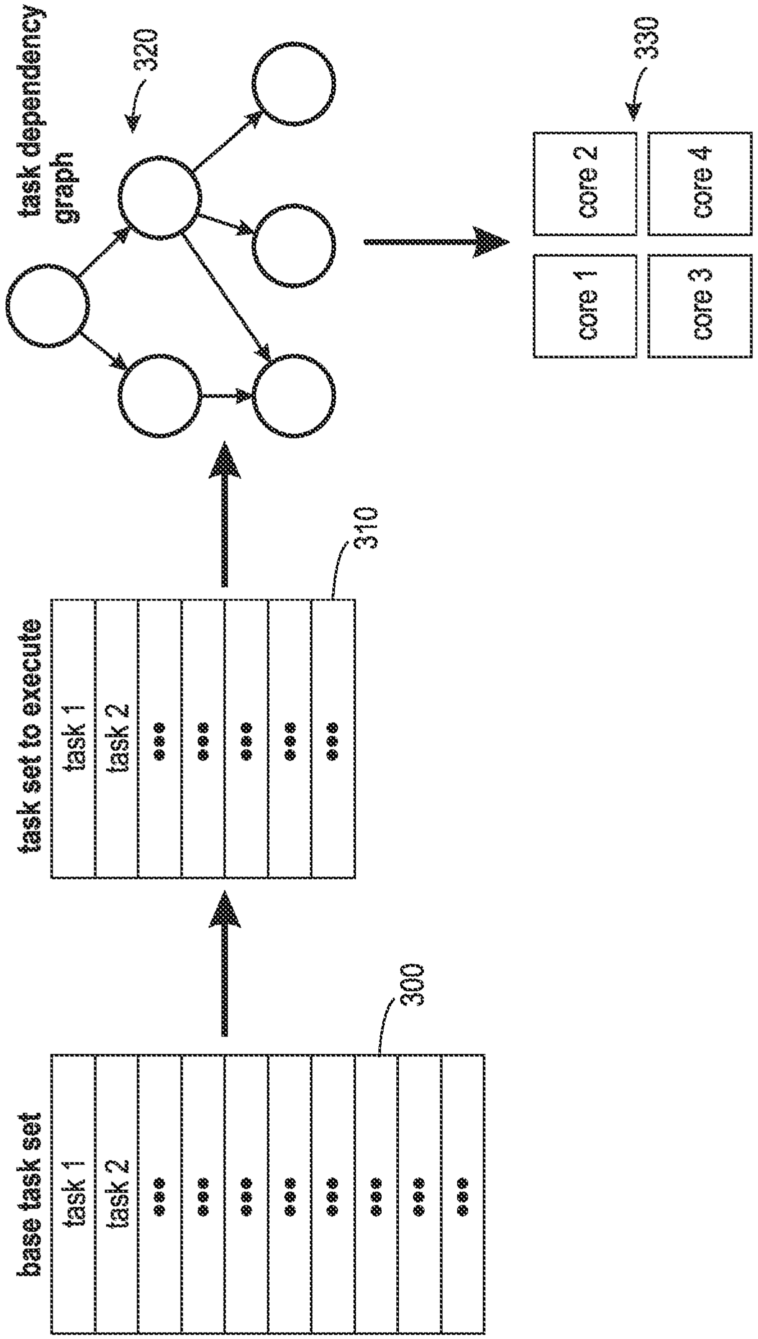
FIG. 3 illustrates functions of the task scheduler according to the presently described embodiments; and, FIG. 4 illustrates an example method according to the presently described embodiments.

With reference now to FIG. 3, using a set of meta data provided for each task defined in a base task set 300, the system chooses a subset 310 of tasks to run in a given cycle, creates an acyclic task dependency graph 320 to determine order of execution, and iteratively walks through the graph assigning tasks to compute resources as they become available. Task meta data is formatted in a manner and provides information sufficient to execute the task within the system. Sufficient information for task execution includes function label, function call parameters, and function call environment configuration such as import calls. Further, task run time or expected energy use is provided as task meta data and used against a per-cycle run time or energy use budget as another filter to determine which subset of tasks to run in a cycle. In addition, a shared resource, such as an attached sensor, is provided as task meta data and used to help construct the acyclic task dependency graph.

As shown, tasks within each level can be run concurrently where each level uses an appropriate number of core processors. This approach can help avoid running duplicate tasks. As shown, the top level of the graph 320 (1 node) can be run using one core processor. The middle level (2 nodes) can be run, in at least one form concurrently, using two core processors. And, the bottom level (3 nodes) can be run, in at least one form concurrently, using three core processors.

Task filtering uses availability of data and/or availability of a hardware resource, such as a sensor, to determine which tasks to run. Each task has a priority which is also summed up to provide a weight to determine the highest priority task to be completed using the least power consumption. The task filtering also compares the time elapsed between when a task was last run and the desired time interval between task runs to determine which tasks to run. Further, the task execution time is recorded in a log as a reference to determine the elapsed time from the last run of a particular task only when the task was successfully completed.

The tasks are then assigned to appropriate core processors 330 of the single board computer (SBC), or second processor 26-2. If there are not enough cores, the impacted tasks must wait and possibly be re-prioritized.

Figure 4:
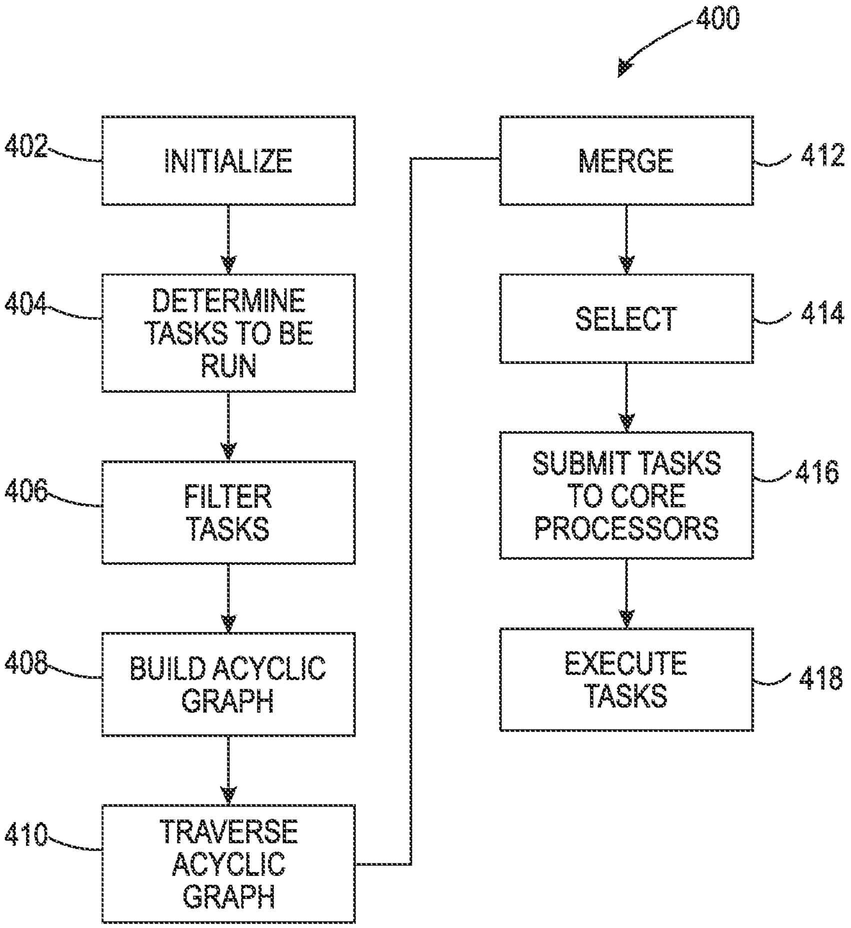

With reference now to FIG. 4, a method 400 is shown. It should be appreciated that the method 400 is merely an example of a method that can be executed by the system (e.g., a float device having a single board computer (SBC) or second processor 26-2 and suitable memory and stored executable code) according to the presently described embodiments. As shown, initially, for each task, task dependencies, priority weights, execution parameters, and power estimates are defined (at 402). Any number of these parameters may be user-configurable. It should be appreciated that initialization, in at least one form of the presently described embodiments, need only be achieved once. Next, tasks to be run are determined or grabbed based on wakeup type and schedule (e.g., time since last execution parameter) (at 404). The method then filters out tasks for any broken/bad/disabled sensor (at 406). Task dependencies are used to build acyclic graph (at 408). The acyclic graph is iteratively traversed or walked through to assign tasks to processor cores for execution (at 410). Each set is then denoted as a 'supertask'. 'Supertasks' are merged together that have common subtasks (at 412). Tasks or 'supertasks' are selected for processing by using, for example, a knapsack algorithm, that selects based on defined criteria. In this regard, selection of tasks for execution could be based on a variety of different factors or criteria. In at least one form, priority weights of all sub-tasks (or tasks) are summed and selection of tasks for execution is based on a maximum summed priority weight and power estimates (at 414). Then, tasks are submitted to processor cores for execution (at 416). The selected tasks are then executed based on task dependency graph (at 418).

As an alternative, task run time or expected energy use can be used in conjunction with an overall run time or energy use budget as an additional factor for determining which tasks to run in a given cycle. The concept of a shared resource, like an attached sensor, can be added as a task meta data field and used in construction of the task dependency graph.

Further, the presently described embodiments could be used in any energy-constrained IoT application where a particular device is capable of running multiple functionalities in parallel.

The above methods, system, platforms, modules, processes, algorithms and/or apparatus have been described with respect to particular embodiments. It is to be appreciated, however, that modifications and/or alteration are also contemplated. For example, the function of transmitting may be modified, eliminated or delayed in certain implementations.

For clarity and simplicity, the present specification refers to structural and/or functional elements, relevant standards, algorithms and/or protocols, and other components, methods and/or processes that are commonly known in the art without further detailed explanation as to their configuration or operation except to the extent they have been modified or altered in accordance with and/or to accommodate the preferred and/or other embodiment(s) presented herein. Moreover, the apparatuses and methods disclosed in the present specification are described in detail by way of examples and with reference to the Figures. Unless otherwise specified, like numbers in the Figures indicate references to the same, similar or corresponding elements throughout the Figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the Figures.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein may suitably be implemented via hardware, software, firmware or a combination thereof. In particular, various modules, components and/or elements may be embodied by processors, electrical circuits, computers and/or other electronic data processing devices that are configured and/or otherwise provisioned to perform one or more of the tasks, steps, processes, methods and/or functions described herein. For example, a processor, computer or other electronic data processing device embodying a particular element may be provided, supplied and/or programmed with a suitable listing of code (e.g., such as source code, interpretive code, object code, directly executable code, and so forth) or other like instructions or software or firmware, such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine-readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to exemplary embodiments. Obviously, modifications and alterations will occur to others upon reading and understanding the present specification. It is intended that all such modifications and alterations are included herein insofar as they come within the scope of the appended claims or the equivalents thereof. It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for scheduling tasks in a resource constrained system, comprising:

determining tasks to be run based on time elapsed since last running of the task, wherein each task is associated with execution parameters comprising task run time and power estimate as task meta data and are used against a per-cycle run time and current power budget to determine which subset of tasks to run in a cycle;

building an acyclic graph based on the task dependencies;

iteratively traversing the acyclic graph from a root node to leaf nodes to determine a set of tasks and an order of execution;

merging sets of tasks based on common sub-tasks;

selecting for execution, one or more of the tasks and sets of tasks with a highest priority and the task run time and the power estimate that satisfy the current power budget;

submitting the selected tasks to core processors; and executing the submitted tasks.

2. The method as set forth in claim 1 wherein the determining of tasks to be run is based on at least one of availability of data and availability of a hardware resource, such as a sensor, to determine which tasks to run.

3. The method as set forth in claim 1 wherein the determining comprises comparing the time elapsed between when a task was last run and the desired time interval between task runs to determine which tasks to run.

4. The method as set forth in claim 1 wherein execution time for the task is recorded in a log as a reference to determine the elapsed time from the last run of a particular task only when the task was successfully completed.

5. The method as set forth in claim 1 wherein the task meta data is formatted to provide information sufficient to execute the tasks within the system and further comprises function label, function call parameters, and function call environment configuration such as import calls.

6. The method as set forth in claim 1 further comprising:

determining the highest priority by summing priority weights of all sub-tasks.

7. The method as set forth in claim 1 wherein a shared resource, such as an attached sensor, is provided as task meta data and used to construct the acyclic graph.

8. The method as set forth in claim 1 wherein at least one of the following parameters is user-configurable: task dependencies, priority weights, execution parameters, and power estimates.

9. A task scheduler system for a resource constrained system, comprising:

at least one processor;

at least one memory having code or instructions stored thereon, wherein execution of the code or instructions by the processor causes the system to:

determine tasks to be run based on time elapsed since last running of the task, wherein each task is associated with execution parameters comprising task run time and power estimate as task meta data and are used against a per-cycle run time and current power budget to determine which subset of tasks to run in a cycle;

build an acyclic graph based on the task dependencies;

iteratively traverse the acyclic graph from a root node to leaf nodes to determine a set of tasks and an order of execution;

merge sets of tasks based on common sub-tasks;

select for execution, one or more of the tasks and sets of tasks with a highest priority and the task run time and the power estimate that satisfy the current power budget;

submit the selected sets of tasks to core processors; and execute the submitted tasks.

10. The system as set forth in claim 9 wherein determining the tasks to be run is based on at least one of availability of data and availability of a hardware resource, such as a sensor, to determine which tasks to run.

11. The system as set forth in claim 9 wherein determining the tasks to be run comprises comparing the time elapsed between when a task was last run and the desired time interval between task runs to determine which tasks to run.

12. The system as set forth in claim 9 wherein execution time for the task is recorded in a log as a reference to determine the elapsed time from the last run of a particular task only when the task was successfully completed.

13. The system as set forth in claim 9 wherein the task meta data is formatted to provide information sufficient to execute the tasks within the system and further comprises function label, function call parameters, and function call environment configuration such as import calls.

14. The system as set forth in claim 9 wherein the system is caused to determine the highest priority by summing priority weights of all sub-tasks wherein the selecting of sets of tasks for execution is based on a maximum summed priority weight and power estimates.

15. The system as set forth in claim 9 wherein a shared resource, such as an attached sensor, is provided as task meta data and used to construct the acyclic graph.

16. The system as set forth in claim 9 wherein at least one of the following parameters is user-configurable: task dependencies, priority weights, execution parameters, and power estimates.

* * * * *